No. 698,954. Patented Apr. 29, 1902.
C. P. HULST.
CAR FENDER.
(Application filed Nov. 21, 1901.)
(No Model.)

Witnesses:
Geo. W. Young,
B. C. Roloff.

Inventor
Clarence P. Hulst
By H. G. Underwood
Attorney

UNITED STATES PATENT OFFICE.

CLARENCE P. HULST, OF MILWAUKEE, WISCONSIN.

CAR-FENDER.

SPECIFICATION forming part of Letters Patent No. 698,954, dated April 29, 1902.

Application filed November 21, 1901. Serial No. 83,097. (No model.)

*To all whom it may concern:*

Be it known that I, CLARENCE P. HULST, a citizen of the United States, and a resident of Milwaukee, in the county of Milwaukee and State of Wisconsin, have invented certain new and useful Improvements in Car-Fenders; and I do hereby declare that the following is a full, clear, and exact description thereof.

My invention has especial reference to the fenders employed in electric and other street-cars; and it consists in certain peculiarities of construction and combination of parts, as will be fully set forth hereinafter in connection with the accompanying drawings and subsequently claimed.

Figure 1:
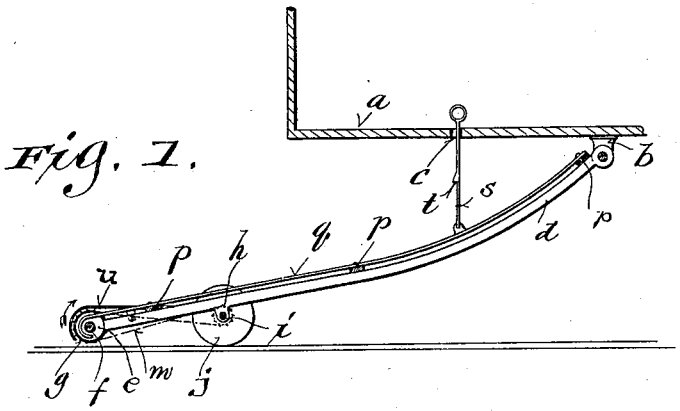
Figure 2:
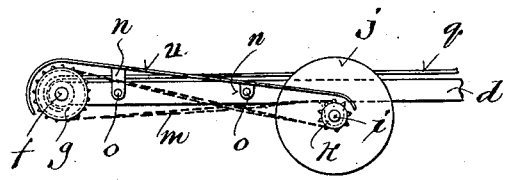
Figure 3:
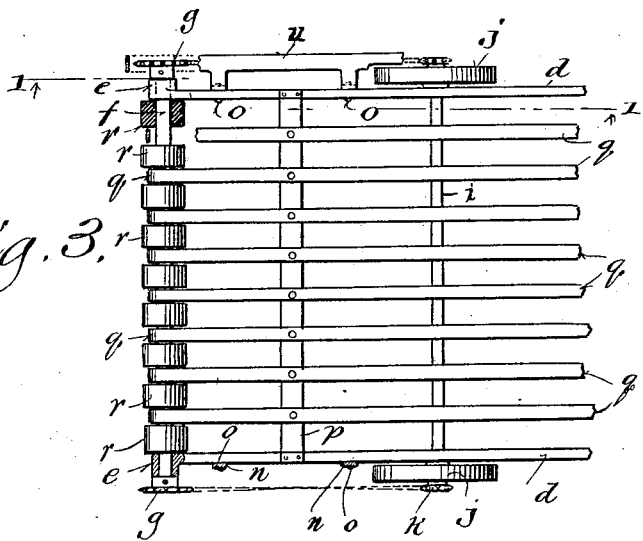

In the said drawings, Figure 1 is a longitudinal sectional view of my said invention, taken on the plane indicated by the line 1 1 in Fig. 3, showing the fender applied to the platform of a car and in its lowered position. Fig. 2 is a detail view in side elevation drawn to an enlarged scale and representing the fender in raised position. Fig. 3 is a partially broken plan view of said device.

Referring to the drawings, $a$ represents the front platform of a car of any ordinary construction, said platform being provided with hangers $b$ on the under sides and preferably with openings $c$ at any convenient point—
for example, just back of the controller-box in electric cars. Pivotally secured to the said hangers $b$ are the inner ends of the side bars $d$ of the fender, whose outer ends terminate in hubs $e$ for the reception of the front transverse shaft $f$, to whose extreme outer ends are secured the wheels $g$, which in the preferred construction illustrated in the drawings are shown as sprocket-wheels. Some little distance back of the shaft $f$ the side bars $d$ are provided with downward-projecting ears $h$, which form bearings for a rear transverse shaft $i$, carrying friction-wheels $j$, designed to travel on the track in advance of, but in line with, the forward wheels of the car-trucks, and the hubs of these friction-wheels $j$ project outwardly and are fast with smaller wheels $k$, herein shown as sprocket-wheels, the wheels $g$ and $k$ being connected by crossed belts or chains $m$. In the present showing, as said wheels are represented as having sprocket-teeth thereon, the said crossed belts $m$ would necessarily be sprocket-chains, and this is the preferred construction, although it is obvious that said wheels $g$ $k$ might be pulleys connected by crossed friction-belts, if desired, or that said wheels might be otherwise geared together; but in any case it is desirable that the said crossed belts, chains, or other gears and the thus-connected pulleys or wheels should be protected by proper guards or casings, the preferred form being the guards $u$ shown, having depending ears $n$ $n$, by which and bolts or rivets $o$ $o$ they are secured to the side bars $d$. The said side bars $d$ are connected at intervals by transverse strips $p$ $p$ $p$, to which are secured at proper distances apart the longitudinal fender-strips $q$ $q$ $q$, whose outer ends curve around the front transverse shaft $f$, as best shown in Fig. 1, the said shaft $f$ being provided with a series of rollers $r$ $r$, preferably of india-rubber or analogous yielding material, these rollers alternating in position with the described longitudinal fender-strips $q$, as clearly shown in said Fig. 1. The fender is further provided with suitable means for elevating the same and sustaining it in its raised position—such, for example, as the hinged rod $s$, passing through the opening $c$ in the car-platform, and said rod having a catch $t$ for engagement with the upper edge wall of said opening when the rod and fender are raised. The rollers $r$ are secured in any suitable way to the shaft $f$, and the said shaft is preferably made square in cross-section between the hubs of the side bars $d$, with corresponding square openings through the said rollers.

The operation of my invention will be readily understood from the foregoing description of its construction, taken in connection with the accompanying drawings. When the device is not in use it is brought up, as by the rod $s$, and held closely under the car-platform; but when it is to be used it is dropped down to the position shown in Fig. 1, and then the pulleys or wheels $g$ will be slightly above the tracks, with the friction-wheels $j$ in contact with said tracks, and as the fender comes against any body or object lying in the path of the car the rubber or other rollers $r$ $r$ (which are revolving in an opposite direction from the wheels $j$ by reason of the described gearing or connection) will serve to throw said body or object upwardly, as indicated by the arrow in Fig. 1, up and back on the fender, where it will be supported safely by the fender-strips q q.

It is important that the described rollers r r on the front shaft f should extend upward to a plane above that of the forward end of the fender to insure that the person or other object being caught up by said rollers shall not encounter the slightest obstruction, as such would naturally militate against said person being carried upward and back upon the fender, and it is also of importance that the longitudinal fender-strips q q should continue forward of the rear line of said rollers r r, so that there may be no continuous transverse break between them, for which reason a series of rollers r r is employed, and the forward ends of said strips q q are extended, as stated, between each pair of adjacent rollers and curved around the said front shaft, the upper plane of said strips at their forward ends being thus below the upper plane of the said rollers, the said strips further insuring that each roller r shall remain in its proper place on the said shaft. Another advantage of my described independent separate rollers lies in the fact that if one of them disintegrates or becomes broken or injured in use the same can be removed or replaced by a new roller, besides which the series of rollers are better adapted to draw up objects upon the roadbed than a single continuous revolving shaft would be, for the reason that the said separate rollers present many additional points of contact.

Having thus described my invention, what I claim as new, and desire to secure by Letters Patent, is—

1. In a car-fender, the combination with a suitable frame comprising longitudinal and transverse strips, and having friction-wheels secured thereto and adapted to travel upon the tracks, of a front transverse shaft having a series of independent separate rollers mounted thereon, and carrying wheels fast on said shaft and connected to said friction-wheels so as to revolve in the opposite direction to the revolution of said friction-wheels, and the said front shaft being adapted, by its backward revolution, to carry objects with which it comes in contact up and over upon the frame of the fender, the said rollers on the front shaft being separated by, and rising to a higher plane than, the front ends of the said longitudinal strips.

2. In a car-fender, the combination with a suitable frame comprising longitudinal and transverse strips, and having friction-wheels secured thereto and adapted to travel upon the tracks, of a front transverse shaft, wheels fast on said shaft and supported above said tracks, and cross-geared to said friction-wheels so as to revolve in opposite directions thereto, and a series of independent separate rollers of yielding material mounted on the said front transverse shaft, the said longitudinal strips of the fender-frame alternating with the said rollers, and the front ends of said strips being curved around the said front shaft.

3. The combination with a car-platform provided with hangers on its under side, and an opening therethrough in front of said hangers, of a fender-frame, having side bars hinged to said hangers, and projecting in front of said platform, and having their front ends united by a transverse shaft pivotally secured thereto, said shaft carrying wheels fast on its outer ends; a rear transverse shaft pivotally secured to said side bars, and carrying friction-wheels adapted to travel on the tracks, and geared to the wheels on the ends of the said front transverse shaft, the wheels on the two transverse shafts being adapted to revolve in opposite directions; a series of independent separate rollers on the first transverse shaft; and a rod, hinged to the fender-frame and passing through the said opening in the platform, said rod being provided with a catch for supporting the fender-frame in a raised position when not in use.

In testimony that I claim the foregoing I have hereunto set my hand, at Milwaukee, in the county of Milwaukee and State of Wisconsin, in the presence of two witnesses.

CLARENCE P. HULST.

Witnesses:
H. G. UNDERWOOD,
B. C. ROLOFF.